United States Patent [19]

Licher et al.

[11] Patent Number: 5,207,474
[45] Date of Patent: May 4, 1993

[54] FOLDING TOP FOR A PASSENGER CAR WITH FOLDING ROOF

[75] Inventors: Siegfried Licher, Georgsmarienhütte; Wolfgang Richter, Wallenhorst, both of Fed. Rep. of Germany

[73] Assignee: Wilhelm Karmann GmbH, Osnabrueck, Fed. Rep. of Germany

[21] Appl. No.: 906,064

[22] Filed: Jun. 29, 1992

[30] Foreign Application Priority Data

Jul. 4, 1991 [DE] Fed. Rep. of Germany ... 9108242[U]
May 20, 1992 [DE] Fed. Rep. of Germany ... 9206807[U]

[51] Int. Cl.$^5$ .............................................. B60J 7/12
[52] U.S. Cl. ..................... 296/107; 296/108; 296/116; 296/136
[58] Field of Search ............... 296/107, 108, 116, 117, 296/136

[56] References Cited

U.S. PATENT DOCUMENTS

| | | | |
|---|---|---|---|
| 2,704,225 | 3/1955 | Anschuetz et al. | 296/107 |
| 2,939,742 | 6/1960 | Dardarian et al. | 296/107 |
| 3,994,524 | 11/1976 | Lehmann | 296/107 |
| 4,712,828 | 12/1987 | Albrecht | 296/107 X |
| 4,991,902 | 2/1991 | Schrader et al. | 296/107 |

Primary Examiner—Robert R. Song
Attorney, Agent, or Firm—Jordan and Hamburg

[57] ABSTRACT

A folding top for a passenger car with a folding roof (convertible) includes flexible roofing which is accommodated between opposite pairs of rod linkage legs of a folding rod linkage. With the swivelling motion of the folding rod linkage in a plane parallel to the longitudinal center plane of the vehicle, the folding top can be brought from a closed position held in a windshield region into an essentially superimposed folded position of the rod linkage legs in the rear region of the vehicle. In order to achieve improved handling and a secured covering of the folding top, the region of the top formed in the closed position between the front rod linkage legs is constructted as a shell for the top, which in itself is stiff and dimensionally stable, and is connected flush with the flexible roofing and can be fixed in the folded position in the rear region over the folded top in a covering position.

20 Claims, 5 Drawing Sheets

FOLDING TOP FOR A PASSENGER CAR WITH FOLDING ROOF

FIELD OF THE INVENTION

The invention relates to a folding top for a passenger car with a folding roof (convertible).

BACKGROUND OF THE INVENTION

Between the legs of the rod linkage forming the folding system, such folding tops for passenger cars have a flexible roofing which, in the folded-back position in the rear region of the passenger car, is covered together with the rod linkage of the top with a canvas or other cover as a protective enclosure. Mounting such a protective enclosure represents a necessary measure which is associated with a corresponding effort, since driving without an enclosure represents a source of danger during a possible collision. Moreover, a folding top, which is not protected, becomes dirty more quickly.

SUMMARY OF THE INVENTION

It is an object of the invention to provide a folding top for a convertible which folding top can be covered and protected without special effort and, with that, facilitate particularly also short uses of the vehicle with the folding top alternately folded back or closed.

The inventive folding top, with the shell for the top, which is between the front rod linkage legs and is, in itself, stiff and dimensionally stable, is suitable also particularly for brief trips with the top folded back, since the shell for the top forms a protective covering over the folding top in the folded-back position, so that an additional canvas or other cover over the folding top need no longer be installed. In the shell for the top, which forms the front region of the vehicle roof in the closed position of the folding top, an installable sliding roof, which makes additional comfort possible when driving with the folding top in the closed position, can advantageously be built in. The visual appearance of the folding top with the shell for the top in the closed position is improved as a whole owing to the fact that the flexible roofing, in the region of the connection to the shell for the top, forms a symmetrical transition and, by means of special stretching belts, retains a taut contour even while driving.

In a development of the folding rod linkage with two rod linkage legs, the latter can form in each case over the four-bar chain a substructure for the folding top in such a manner, that said folding top is guided during the folding process in a steering track, which makes a uniform swivelling motion of the folding top possible. A tension is brought about in this way in the flexible roofing, which reliably avoids overloading even in the bending region of the respective rod linkage legs.

Due to a synchronous driving of the respective four-bar chain, the kinematics of the folding top are designed so that the region adjoining the shell for the top does not build up with the flexible roofing any additional extensions in the material of the top and, with that, on the whole, a frequent repetition of the folding and closing process is attainable without overloading ranges affecting the wear resistance of the roofing.

With respect to important further advantages and details of the invention, reference is made to the following description and the drawings, in which two embodiments of the object of the invention are illustrated diagrammatically in greater detail.

DESCRIPTION OF THE PREFERRED EMBODIMENTS

Figure 1:
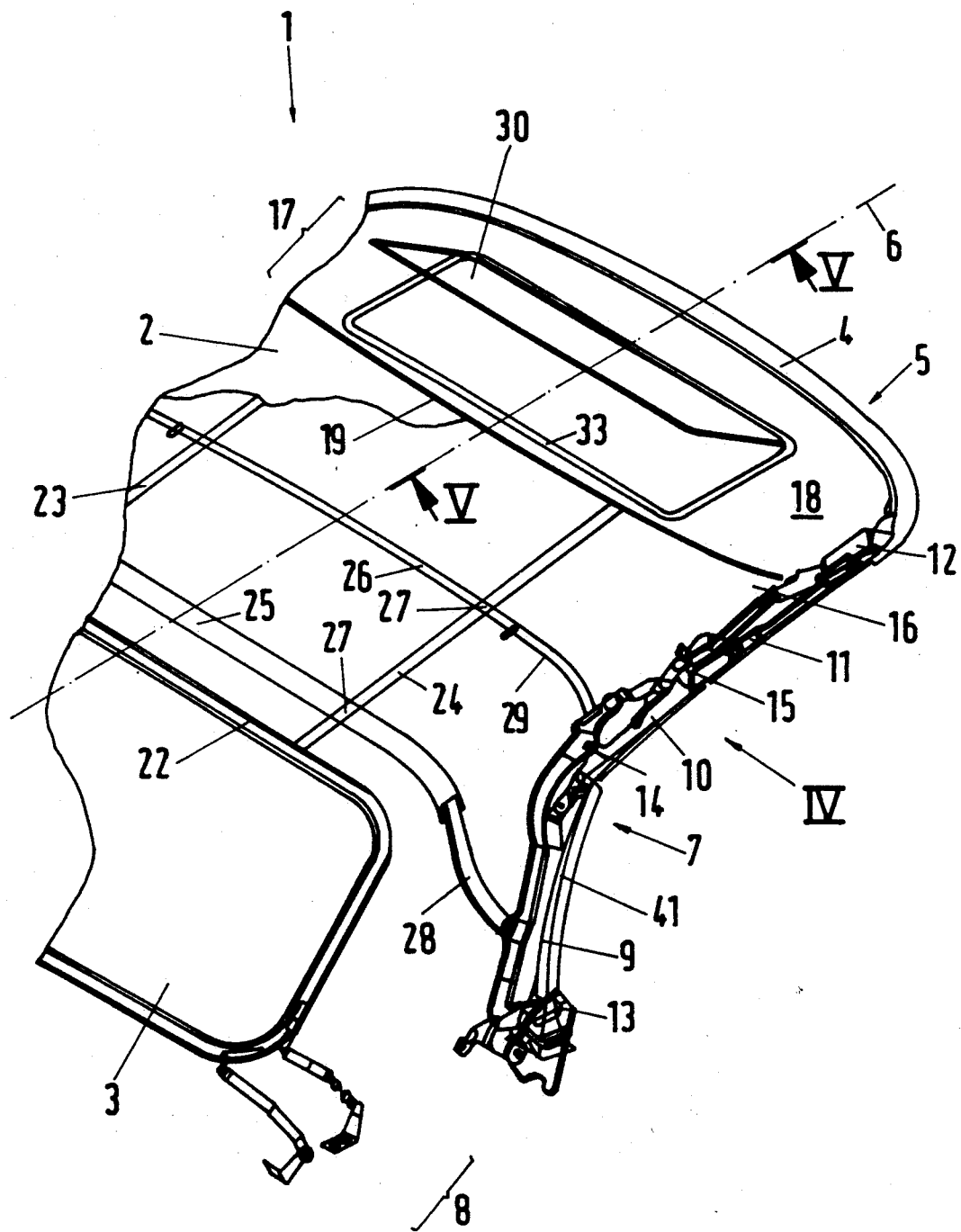
FIG. 1 shows a partially sectional plan view at an angle from the rear of an inventive folding top in the closed position in a first embodiment.

FIG. 1 shows a folding top, which is labeled 1 as a whole. It is intended for a passenger car and has a flexible roofing 2 of, for example, a multilayer textile material, which is stretched in the closed position between a rear region enclosing a rear window 3 and a front region 4 above the vehicle windshield 5 (see also FIG. 5). The flexible roofing 2 is taken up between two folding rod linkages 7 at the edge, which are disposed symmetrically to a longitudinal center plane 6. With these folding rod linkages 7, the flexible roofing 2 can be brought from the closed position shown in an essentially superimposed folded position in the rear region 8 of the vehicle.

Figure 2:
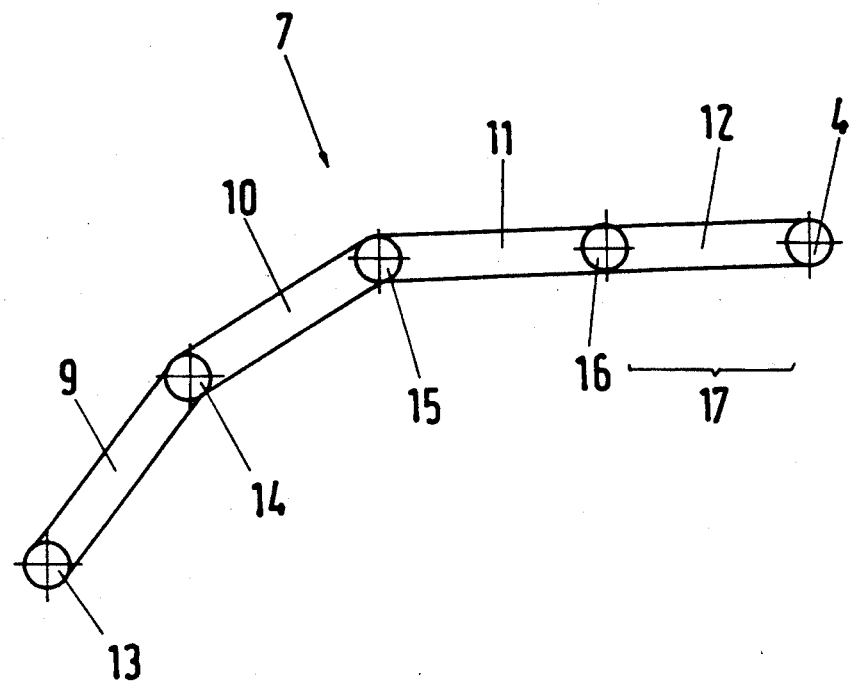
FIG. 2 shows a schematic representation of four rod linkage legs of the folding top in a side view in the closed position similar to FIG. 1.
Figure 3:
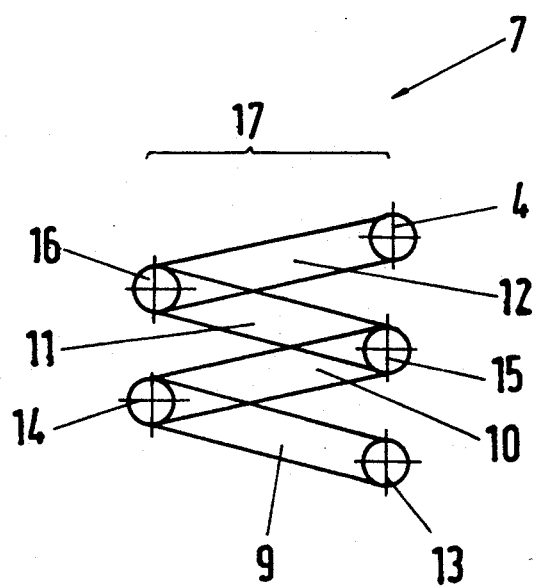
FIG. 3 shows a schematic representation corresponding to FIG. 2 with the rod linkage legs in the folded position.

In the schematic representation of FIGS. 2 and 3, the kinematics of the top, formed by the folding rod linkage 7, are illustrated in greater detail. In a preferred development, the folding rod linkage 7 is provided with four rod linkage legs 9, 10, 11, 12 and the associated rod linkage swivel pins 13, 14, 15, 16. With these and a swivelling motion of the folding top 1 parallel to the longitudinal center plane 6 (FIG. 1), the folding top 1 can be brought from the stretched closed position of FIGS. 1 and 2 into the folded position of FIG. 3. When the folded top 1 is opened, a front region 17 of the top is lifted only slightly and transferred in a guided manner into a covered position above the rod linkage legs 9, 10, 11, 12 and fixed in the rear region 8 with suitable locking means which are not shown (FIG. 3).

Figure 5:
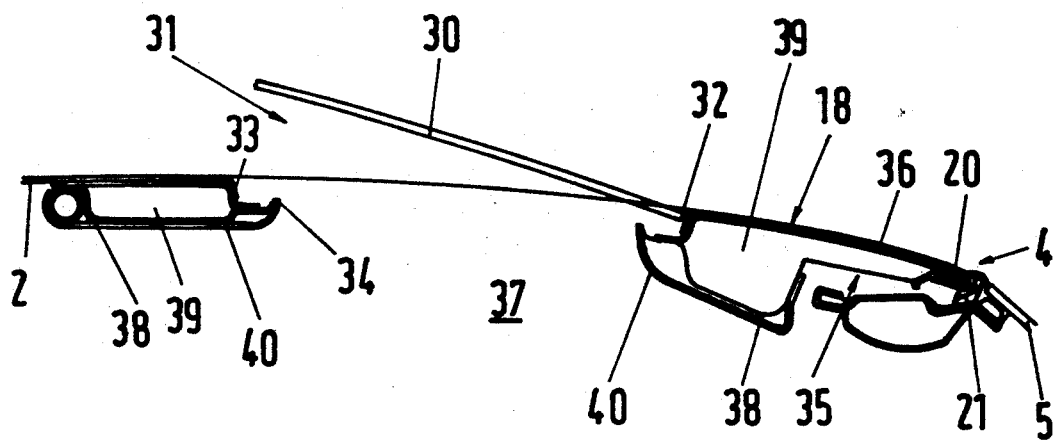
FIG. 5 shows a schematic, sectional representation of the shell of a top along the line V—V in FIG. 1.

Pursuant to the invention, the front region 17 of the folding top 1 is constructed as a shell 18 for the top, which, on the whole, is stiff and dimensionally stable. The rear edge 19 of the shell 18 is constructed flush with the flexible roofing 2 (FIG. 5). The shell 18 for the top can also be covered completely with the top covering of the roofing 2 (not shown). In the closed position shown in FIG. 5, a front edge bead 20 at the shell 18 for the top engages a recess 21 in the car body in the front edge region 4 above the windshield 5 and forms a dimensionally stable tieing down of the folding top 1 in the front region, so that, on the whole and in conjunction with the stretching belts, which are discussed below, a formation of the folding top 1 is created, which offers a symmetrical and taut contour even when subjected to the stress of a head wind.

Starting out from the rear edge 19 of the shell 18 for the top, which in itself is stiff and dimensionally stable (FIG. 1), stretching belts 23, 24, which are directed to a rear window frame 22, are disposed below the flexible roofing 2 parallel to the longitudinal center plane 6, so that the shell 18 for the top as well as the roofing 2 are mutually braced in the closed position of the folding top 1, the shell 18 for the top stabilizing the flexible roofing 2 when the folding top is subjected to the stress of a head wind. The stretching belts 23, 24 are advisably formed from a textile material in order to conform to the flexible roofing 2.

The shape-retaining properties of the flexible roofing 2 can be improved further towards the rear region 8 of the vehicle owing to the fact that a cross-braced hoop 25, 26 additionally undergrasps the roofing 2 between the rear rod linkage legs 9, 10. In the covering regions 27, the cross-braced hoop 25, 26 can be connected with the stretching belts 23, 24. Advisably, connectors 28, 29 are provided to tie down the hoops 25, 26 at the rod linkage legs.

In the embodiment shown in FIG. 1, the shell 18 for the top, which is, in itself, stiff and dimensionally stable is provided additionally with an integrated, installable openable roof 30, which is disposed in the central region of the shell 18 for the top. With this appropriate development, a further improvement in the comfort of the passenger car is achievable, since the openable roof 30 makes it possible to ventilate the interior of the ca when the folding top 1 is in the close position.

The openable roof 30, which is illustrated in greater detail in FIG. 5, is advisably supported in a lowered form recess 31 of the shell 18 for the top so that it can be swivelled at the front edge region towards the windshield and can be placed, towards the rear edge region 33, on a sealing edge 34. The shell 18 for the top itself can advantageously be constructed as an at least regionally double-layered sectional frame 35, with an upper roofing 36 and a cover 38, which forms the boundary towards the top of the interior 37 of the vehicle. The inner covering 38 may, moreover, have form enlargements 39, at which interior upholstery 40 is held.

The shell 18 for the top, which in itself is stiff and dimensionally stable, in conjunction with the rear region of the vehicle, the details of which are not shown, is constructed as an enveloping shape, which covers the folding rod linkage 7 and the material 2 of the top completely or almost completely in the folded position in the rear region 8 of the vehicle. With the enveloping shape, a fixed, protective covering can be attained for the folding top 1 that has been brought into the open position. The traffic safety requirements for driving with opened folding top 1 can be fulfilled therewith with little effort. The additional installation of a canvas or other covering can be omitted, since the shell 18 for the top offers sufficient protection.

Figure 4:
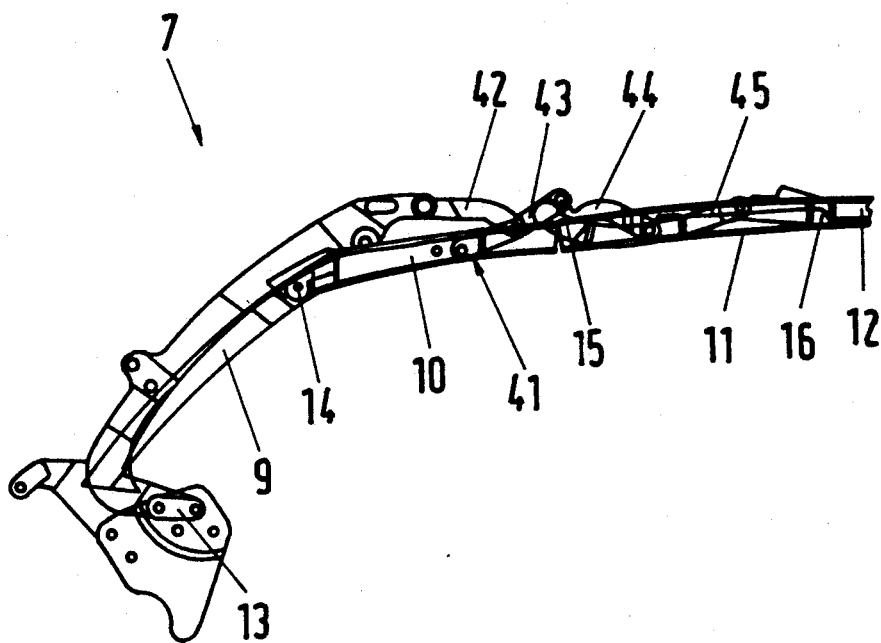
FIG. 4 shows a side view of the folding rod linkage, as viewed in the direction IV of FIG. 1.

The folding rod linkage 7, is shown in greater detail in FIG. 4, with the rod linkage legs 9, 10, 11, 12 guided in an associated top frame 41, has guide rods 42, 43, 44, 45 for the kinematics of the folding top 1. These guide rods 42, 43, 44, 45 fix the folding top 1 at the edge in a stabilizing manner in the closed position shown and make it possible to fold the top back into the open folded position of FIG. 3 with little effort.

The object of the invention is not limited to the embodiment shown in FIGS. 1 to 5 of the drawings and described above. For example, in a further development, the folding rod linkage 7 with the associated folding top 1 with the shell 18 for the top can be modified so that any other even number of rod linkage legs 13, 14, 15, 16 are provided. An embodiment with a lesser number of components for the folding rod linkage 7 at the inventive folding top 1 and particularly simple in the top kinematics for attaining the open and closed positions can be produced already with only two rod linkage legs, which lie opposite one another in pairs, accommodate the folding top 1 between themselves and between the front rod linkage legs of which the shell for the top is disposed.

Figure 6:
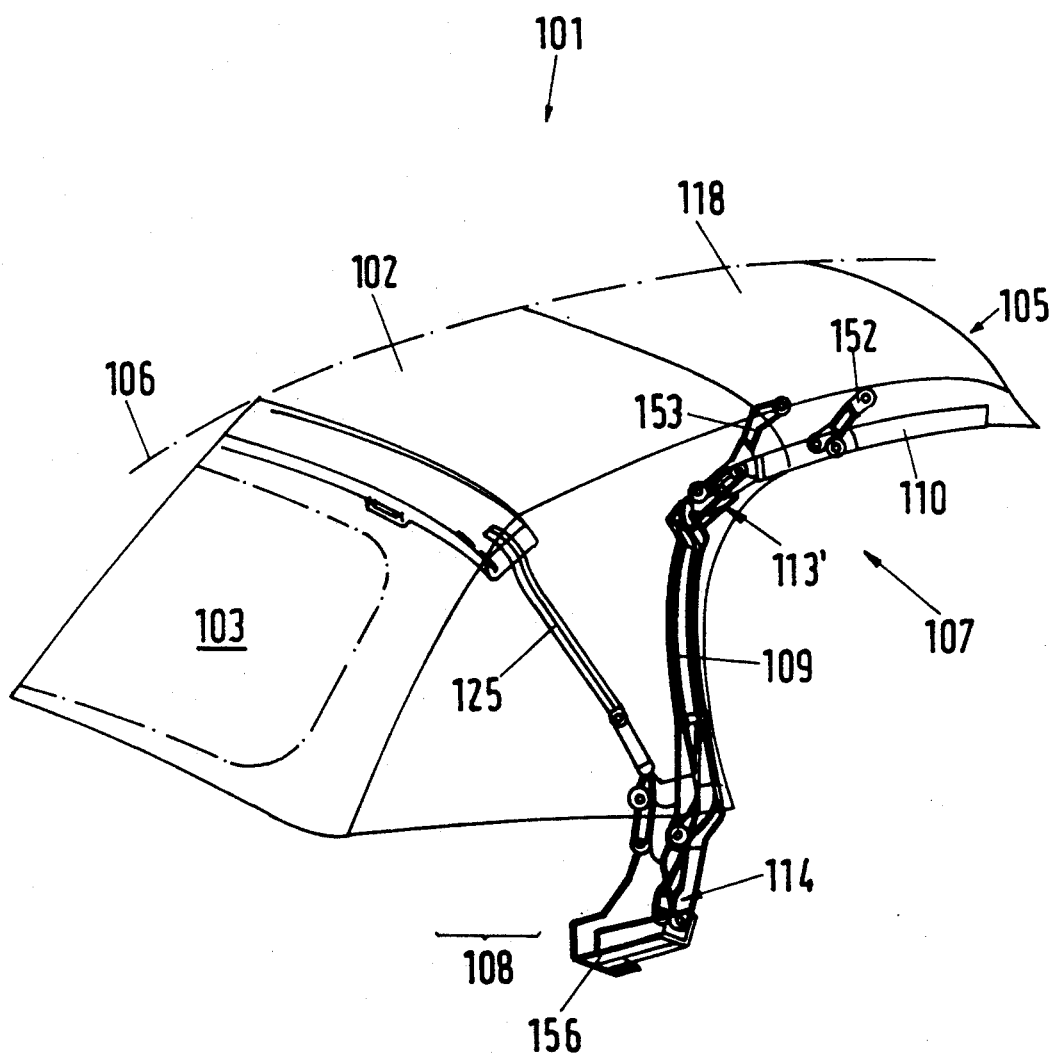
FIG. 6 shows a partially sectional plan view of the folding top which is provided with two rod linkage legs according to a second embodiment.

FIG. 6 shows such a further embodiment of the invention in a partially sectional plan view. For this embodiment, a folding top 101 extends with a flexible roofing 102 in the region between a rear window 103 and a shell 118 for the top. The flexible roofing 102 and the shell 118 for the top are accommodated between two folding rod linkages 107, which are disposed at the edge in each symmetrically to the longitudinal center plane 106 and can be brought with this folding rod linkage 107 from the closed position that is shown (FIG. 6) into an essentially superimposed folded position in the rear region 108 of the vehicle (FIG. 8).

Figure 7:
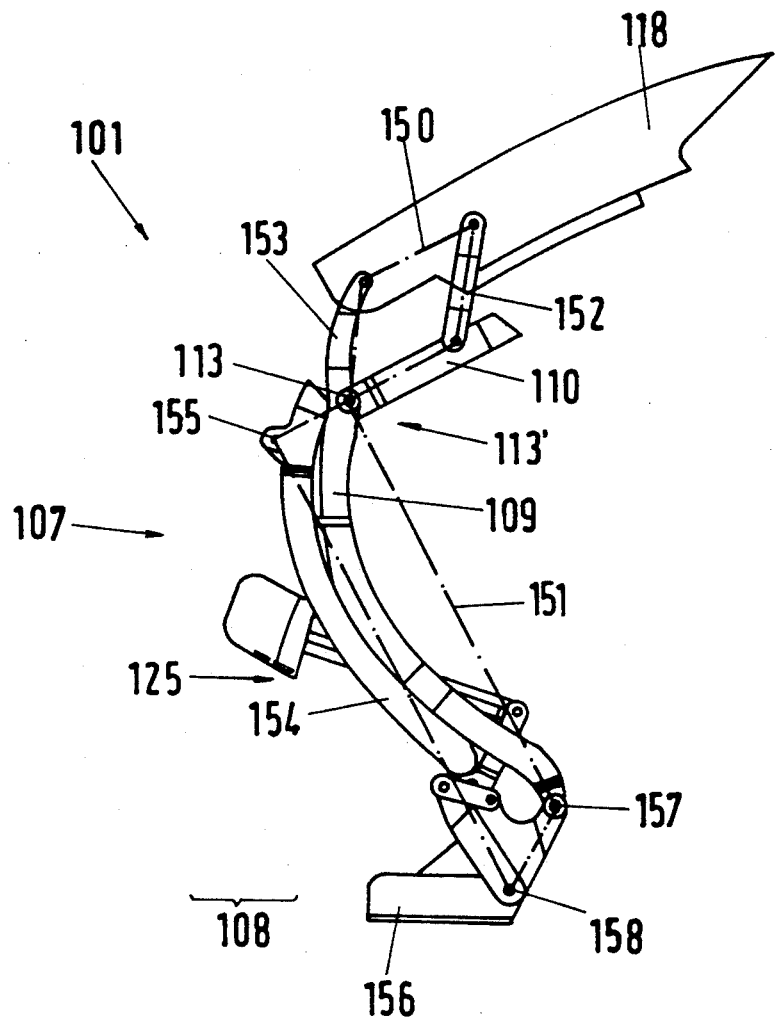
FIG. 7 shows a schematic representation of the folding roof of FIG. 6 in a side view in a first opening phase.
Figure 8:
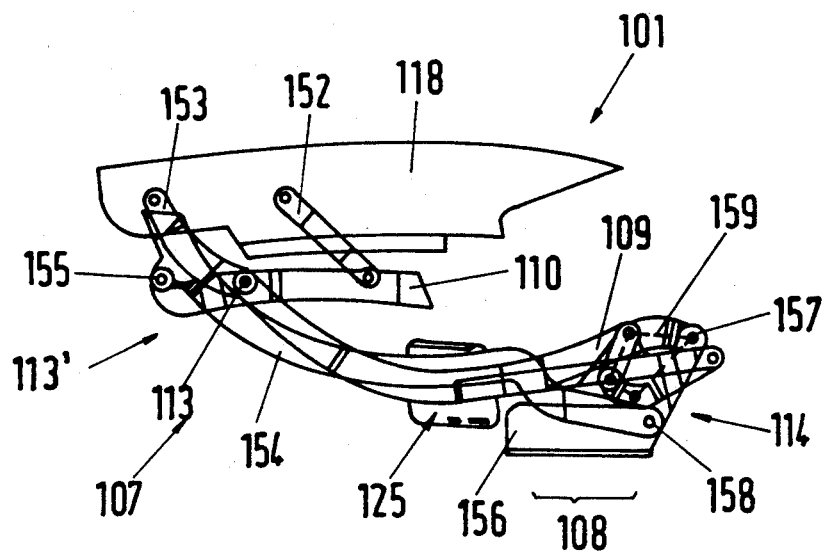
FIG. 8 shows a schematic representation similar to that of FIG. 7 with the folding top in the folded position.

In the schematic representation of FIGS. 7 and 8, the top kinematics, formed with the folding rod linkage 107, are illustrated in greater detail. The folding rod linkage 107, carrying the shell 118 for the top at the front, is provided with only two rod linkage legs 109, 110, which are connected to one another in the region of the associated rod linkage swivel pins 113, 114, so that they can swivel, and are supported towards the vehicle body.

During a swivelling motion of the folding top 101 parallel to the longitudinal center plane 106, the folding top 101 can be brought out of the stretched closed position of FIG. 7 into the folded position of FIG. 8. At the same time, the rod linkage axis 113 for the folding rod linkage 107 forms a main folding axis 113', in the region of which the region of the flexible roofing 102, which adjoins the shell 118 for the top, experiences a folding, which is represented in two folding phases in FIGS. 7 and 8 exemplarily for the folding rod linkage 107.

In order to achieve a folding without regional distortions or overloads at the roofing 102 for the folding and closing process at the folding top 101, a flat link-articulated chain 150, 151 forming a four-bar chain (FIG. 7) is provided in a further advantageous development for the two rod linkage legs 109, 110 as connection to the shell 118 for the top or to the rear region 108 of the vehicle. With the flat link-articulated chain 150, 151 the material of the top, which forms the roofing 102, can be held taut and can also be transferred into the folded position with little stress on the material.

The four-bar chain 150, which is connected directly with the shell for the top, has a front control lever 152 and a rear control lever 153, which is connected in one piece in the region of the main folding axis 113' with the rear rod linkage leg 109. At the same time, the four-bar chain 150 is advantageously formed by a parallelogram determining the steering track of the shell 118 for the top.

The rear four-bar chain 151 is provided with an additional leg 154, which has a contour curvature diminishing to folded height (FIG. 8) and is disposed essentially parallel to the rear rod linkage leg 109. On the one hand, the additional leg 154 supports the front rod linkage leg 110 of the four-bar chain 150 at the end in a joint 155. On the other, the additional leg 154 is supported in the rear region 108 of the vehicle at a supporting member 156 jointly with the rear rod linkage leg 109 in respective joints 157, 58 completing the four-bar chain 151. According to the broken line of FIG. 7, the four-bar chain 151 has the shape of a trapezoid, the corner points of which are formed by the main folding axis 113' and the joints 155, 157 and 158.

With that, as a whole, a folding rod linkage 107 is formed, the individual elements of the two four-bar chains 150, 151 of which become active simultaneously during the folding motion of the folding roof 101 and guide the shell 118 for the top as well as the flexible roofing 102 adjoining thereon in a steering track, which brings about a low-tension folding movement, avoids overloading and, with that, facilitates the movement of the folding top 101 as a whole.

In the region of the rear rod linkage leg 109, a corner hoop 125 braced in an appropriate embodiment. In the closed position of the folding top 101 of FIG. 6, said corner hoop 125 undergrasps the roofing 102 and, with that, also makes possible the tightened contour of the top in this region. The corner hoop 125, moreover, is pivotably connected with the folding rod linkage 107 in such a manner, that during the previously described swivelling motion of the rod linkage legs 109, 110 a corresponding drive can also take place, the folding process is supported and the folding rod linkage 107 and the corner hoop 125 assume a folding position requiring the least space.

The movement phases in FIGS. 7 and 8 illustrate a preferred bracing of the corner hoop 125 over a four-bar chain 159 (FIG. 8), which is in the region of the supporting member 156 and is also driven with the rear four-bar chain 151, the joint 157 forming a common main swivel pin of the four-bar chain 151 and 159. With this, an additional support is achieved for the roofing 102 in the region of the rear window 103 during the folding process (FIG. 7). At the same time, the top tension can be supported essentially against the rear rod linkage leg 109 and the additional leg 154 over an appropriate selection of the pivot.

The folding top 102, constructed with the folding rod linkage 107, thus forms, as a whole, a folding roof, which, even with the frequent repetition of the folding and closing process, can be moved without wear in the region of the flexible roofing 102 from the closed position of FIG. 7 into the folded position of FIG. 8, in which the shell 118 for the top assumes an advantageous covering position.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What is claimed is:

1. A folding top for a motor vehicle comprising foldable linkage means mountable on said motor vehicle and foldable between an up position and a folded position, said linkage means having a front portion connectable to a front part of said motor vehicle when said linkage means is in said up position, said linkage means having a rear portion connected to a rear part of said motor vehicle, a rigid roof part mounted on said front portion, a flexible material means carried by said rear portion, said flexible material means being in an unfolded disposition when said linkage means is in said up position and a folded disposition when said linkage means is in said folded position, said linkage means when in said up position disposing said rigid roof part as a continuation of said unfolded flexible material means such that said rigid roof part and said unfolded flexible material means together form a roof for said motor vehicle, said linkage means when in said folded position disposing said flexible material means in said folded disposition with said rigid roof part overlying said folded flexible material means.

2. A folding top according to claim 1, wherein said linkage means comprises a pair of linkage sub-assemblies, each of said linkage sub-assemblies comprising an even number of link arms and pivot means connecting said link arms to one another.

3. A folding top according to claim 2, wherein each of said sub-assemblies comprises four link arms.

4. A folding top according to claim 1, wherein said rigid roof part comprises a rigid structure having an opening, and a moveable roof section movably mounted on said rigid structure between a closed position in which said moveable roof section covers said opening and an open position in which said moveable roof section uncovers said opening.

5. A folding top according to claim 4 comprising pivotal means for pivotably mounting said moveable roof section between said closed and said open position, and further comprising seal means providing a seal between said moveable roof section and said rigid roof part when said moveable roof section is in said closed position.

6. A folding top according to claim i, wherein said rigid roof part has a front end disposed juxtaposed to the windshield of said motor vehicle when said linkage means is in said up position, said rigid roof part having a rear end spaced from said front end, said flexible material means being connected to said rear end of said rigid roof part.

7. A folding top according to claim 1, wherein said rigid roof part overlies said folded flexible material means and said linkage means when said linkage means is in said folded position.

8. A folding top according to claim 1, wherein said flexible material means includes a rear window, and further comprising stretching belts extending longitudinally of the motor vehicle between said rigid roof part and said rear window when said linkage means is in said up position.

9. A folding top according to claim 8, wherein said stretching belts are made of a flexible material.

10. A folding top according to claim 1, wherein said linkage means includes a pair of sub-assemblies each comprising pivotal link arms, and further comprising at least one transverse support member extending between each of said sub-assemblies for supporting said flexible material means when said linkage means is in said up position.

11. A folding top according to claim 1, wherein said motor vehicle has a windshield with an upper edge portion, said rigid roof part having a front edge portion engageable with said upper edge portion of said windshield.

12. A folding top according to claim 1, wherein said rigid roof part is double layered and includes an outer layer which is disposed externally of the motor vehicle when said linkage means is in the up position and an inner layer which is disposed in the interior of the motor vehicle when said linkage means is in said up position.

13. A folding top according to claim 12, wherein said inner layer comprises upholstery.

14. A folding top according to claim 12, wherein said inner layer comprises support means, and upholstery material mounted on said support means.

15. A folding top according to claim 1, wherein said linkage means comprises a pair of sub-assemblies, each of said sub-assemblies comprising an upper four-pivot means (150) having four pivots and a lower four-pivot means (151) having four pivots, said upper four-pivot means (150) being pivotably connected to said rigid roof part (118) at first and second pivots, said lower four-pivot means (151) being pivotably connected to said motor vehicle (156) at third and fourth pivots (157, 158), said upper four-pivot means (150) and said lower four pivot means (151) having a common pivot (113).

16. A folding top according to claim 15, wherein said upper four-pivot means (150) comprises a link arm (110) and two link elements (152, 153), each of said link elements (152, 153) being pivotably connected to said rigid roof part (118), one of said link elements (152) being pivotably connected to said link arm (110), the other of said link elements (153) being pivotably connected to said link arm (110) at said common pivot (113).

17. A folding top according to claim 16, wherein said lower four-pivot means (151) comprises two link bars (109, 154), each of said link bars (109, 154) being pivotably connected to said motor vehicle (156) at said third and fourth pivots (157, 158), one of said link bars (154) being pivotably connected to said link arm (110) at a fifth pivot (155), the other link bar (109) being pivotably connected to said link arm (110) at said common pivot (113).

18. A folding top according to claim 17, wherein said link arm (110) has an intermediate portion disposed between two end portions, said common pivot (113) being disposed on said intermediate portion, said fifth pivot (155) being disposed at one of said end portions of said link arm (110), one of said link elements (152) being pivotably connected to said other end portion of said link arm (110).

19. A folding top according to claim 15 further comprising a transverse roof support means (125) disposed in a position to underlie and to support said flexible material means when said linkage means is in said up position, said roof support means (125) being pivotably connected to said lower four-pivot means (151).

20. A folding top according to claim 19 further comprising another four-pivot means (159) having a pivot connected to said transverse roof support means (125), and a common pivot (157) pivotably interconnecting said other four-pivot means (159) and said lower four-pivot means (151).

* * * * *